US009904559B2

(12) United States Patent
Kato

(10) Patent No.: US 9,904,559 B2
(45) Date of Patent: Feb. 27, 2018

(54) INFORMATION PROCESSING APPARATUS AND ACTIVATION METHOD THEREFOR FOR PROCESSING DATA OF A HIBERNATION IMAGE

(71) Applicant: CANON KABUSHIKI KAISHA, Tokyo (JP)

(72) Inventor: Kensuke Kato, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 427 days.

(21) Appl. No.: 14/061,218

(22) Filed: Oct. 23, 2013

(65) Prior Publication Data

US 2014/0122854 A1    May 1, 2014

(30) Foreign Application Priority Data

Oct. 25, 2012 (JP) .................................. 2012-235481
Oct. 25, 2012 (JP) .................................. 2012-235482
Oct. 25, 2012 (JP) .................................. 2012-235483

(51) Int. Cl.
*G06F 9/44* (2006.01)
(52) U.S. Cl.
CPC ................................. *G06F 9/4418* (2013.01)
(58) Field of Classification Search
CPC .................................................... G06F 9/4418
See application file for complete search history.

(56) References Cited

U.S. PATENT DOCUMENTS

| | | | | |
|---|---|---|---|---|
| 5,560,023 A * | 9/1996 | Crump | ................. | G06F 1/3203 713/321 |
| 6,209,088 B1 * | 3/2001 | Reneris | ................. | G06F 1/3203 713/1 |
| 6,336,153 B1 * | 1/2002 | Izumida | ................. | G06F 9/4418 710/20 |
| 6,336,161 B1 * | 1/2002 | Watts | ................. | G06F 1/30 711/103 |
| 6,374,353 B1 * | 4/2002 | Settsu | ................. | G06F 9/4406 713/2 |
| 6,611,919 B1 * | 8/2003 | Matsuya | ................. | G06F 9/4418 713/320 |

(Continued)

FOREIGN PATENT DOCUMENTS

JP    2001-022464 A    1/2001

*Primary Examiner* — Thomas Lee
*Assistant Examiner* — Gary Collins
(74) *Attorney, Agent, or Firm* — Canon USA, Inc. I.P. Division

(57) ABSTRACT

When an information processing apparatus is requested to transfer to a system interruption state, the information processing apparatus determines whether to compress data at each page, and generates a hibernation image configured of compressed data and non-compressed data. In an operating system activation period, the information processing apparatus determines whether to execute hibernation activation processing before initializing a memory management mechanism. In a case where the information processing apparatus executes the hibernation activation processing, the information processing apparatus reduces a size of the memory management region up to the size required for the initialization of the kernel, and reads the compressed data in parallel with initialization of hardware. After initializing the kernel, the information processing apparatus reads the non-compressed data in parallel with decompression of the compressed data.

16 Claims, 16 Drawing Sheets

(56) References Cited

U.S. PATENT DOCUMENTS

| | | | | | |
|---|---|---|---|---|---|
| 7,908,470 | B1* | 3/2011 | Cavanna | ............... | G06F 9/4401 711/1 |
| 2002/0138669 | A1* | 9/2002 | Kadatch | ............... | G06F 1/3203 710/5 |
| 2005/0149646 | A1* | 7/2005 | Kadatch | ............... | G06F 1/3203 710/24 |
| 2007/0277051 | A1* | 11/2007 | Reece | ............... | G06F 1/3203 713/323 |
| 2009/0172379 | A1* | 7/2009 | Rothman | ............... | G06F 8/456 713/2 |
| 2010/0049960 | A1* | 2/2010 | Okamoto | ............... | G06F 9/4401 713/1 |
| 2010/0058045 | A1* | 3/2010 | Borras | ............... | G06F 9/44573 713/2 |
| 2010/0235618 | A1* | 9/2010 | Erforth | ............... | G06F 9/4403 713/2 |
| 2011/0107020 | A1* | 5/2011 | Duan | ............... | G01S 19/34 711/104 |
| 2012/0084547 | A1* | 4/2012 | Jung | ............... | G06F 9/4406 713/2 |
| 2012/0131320 | A1* | 5/2012 | Park | ............... | G06F 9/4401 713/2 |
| 2012/0221843 | A1* | 8/2012 | Bak | ............... | G06F 9/4418 713/100 |
| 2012/0311240 | A1* | 12/2012 | Kato | ............... | G06F 9/4418 711/103 |
| 2013/0262538 | A1* | 10/2013 | Wegener | ............... | G06F 13/28 708/203 |
| 2014/0344486 | A1* | 11/2014 | Wu | ............... | G06F 13/28 710/22 |

* cited by examiner

INFORMATION PROCESSING APPARATUS AND ACTIVATION METHOD THEREFOR FOR PROCESSING DATA OF A HIBERNATION IMAGE

BACKGROUND

Field

Aspects of the present invention generally relate to a technique for activating an information processing apparatus having a hibernation mechanism, at high speed.

Description of the Related Art

In recent years, increasing attention has been given to "hibernation" which can reduce power consumption of an information processing apparatus in a stand-by state. The hibernation is a system interruption mechanism. When a system is being activated, information in a memory, a central processing unit (CPU) register, or information about a device (hereinafter, referred to as "hibernation image") is saved in a non-volatile storage device such as a hard disk. Even if the power is turned off subsequently, the system is restored to the same state as the previous state by reading the saved hibernation image when the system is activated next time (hereinafter, referred to as "hibernation activation"). The hibernation may be employed in order to shorten the activation time of the system.

Methods for activating the system through the hibernation can be roughly divided into two types. A method in which a restoration operation is executed by a basic input-output system (BIOS) function or a boot loader function, and a method in which a restoration operation is executed by a kernel function of an operating system are provided as the two types of activation methods.

In the hibernation activation by the kernel function, after initializing the kernel, a hibernation image previously stored in a non-volatile storage device is read to restore the state before the system was transferred to the hibernation. Compared to the hibernation activation by the BIOS, the hibernation activation by the kernel function is excellent in terms of general applicability because the device is initialized through a normal activation sequence.

Compared to the hibernation activation by the BIOS or the boot loader, the hibernation activation by the kernel function takes longer activation time because the activation sequence thereof requires longer processing time. Therefore, Japanese Patent Application Laid-Open No. 2001-022464 discloses a method in which the entire hibernation image is compressed and saved to a non-volatile storage device.

SUMMARY

According to an aspect of the present invention, an information processing apparatus includes a volatile memory, a compression unit configured to compress at least a part of data stored in the volatile memory into compressed data, a non-volatile memory configured to store non-compressed data which is not compressed by the compression unit and the compressed data as hibernation images, a first reading unit configured to read the compressed data stored in the non-volatile memory into a region in the volatile memory which is not used for initialization of a kernel in parallel with the initialization of the kernel executed by using a part of the volatile memory, a decompression unit configured to decompress the compressed data read into the volatile memory, a second reading unit configured to read non-compressed data stored in the non-volatile memory into the volatile memory in parallel with the processing executed by the decompression unit, and an activation unit configured to activate a system based on the data decompressed by the decompression unit and the non-compressed data read by the second reading unit.

Further features and aspects of the present disclosure will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Figure 1:
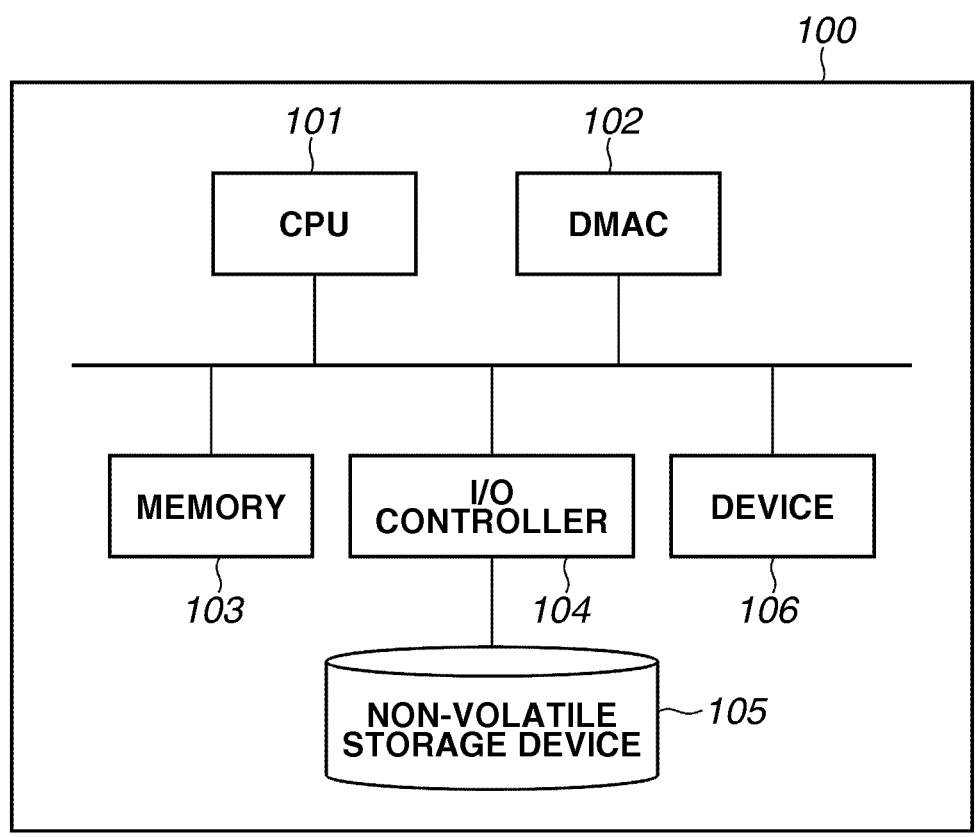
FIG. 1 is a block diagram schematically illustrating a configuration of an information processing apparatus.

FIG. 1 illustrates a general configuration of an information processing apparatus 100. A central processing unit (CPU) 101 and a direct memory access controller (hereinafter, referred to as "DMAC") 102 read and write data from/to a volatile memory 103 of a dynamic random access memory (DRAM), which includes a double data rate synchronous dynamic random access memory (DDRSDRAM). The DMAC 102 can access the volatile memory 103, a non-volatile storage device 105, and devices 106 through direct memory access. Based on the requests from the CPU 101 and the DMAC 102, an input-output controller (hereinafter, referred to as "I/O controller") 104 reads and writes data from/to the non-volatile storage device 105 such as a flash memory, a hard disk drive (HDD), or a solid state drive (SSD) serving as a non-volatile memory. The devices 106 are peripheral devices that are initialized by the CPU 101. Various kinds of devices such as a graphic board connected through a peripheral components interconnect bus (PCI), and a scanner or a printer connected through a universal serial bus (USB) can be used as the devices 106. Each of the devices 106 includes a status register for storing its own state, and a configuration register for storing values such as a value corresponding to a parameter for image processing and a value indicating a processing mode which are used for processing. In addition, more than one device 106 may be provided.

The CPU 101 loads a program included in the non-volatile storage device 105 onto the memory 103, and fetches the program from the memory 103 to execute the processing described below.

The hibernation is a technique for storing a state of the system and restoring the stored state of the system, and the data which indicates a state of the system to be stored or restored is referred to as a hibernation image (the format of the hibernation image will be described below). The hibernation image is stored in the non-volatile storage device 105.

Hereinafter, a general flow of the hibernation processing will be described. When a user (or user application) requests interruption of the system, the hibernation image is generated based on the data written in the memory 103, the data indicating a state of the other devices 106, and a register value of the CPU 101. Then, the generated hibernation image is read into the non-volatile storage device 105. When the information processing apparatus 100 is turned off and activated again, initialization of a kernel is started. Immediately after the initialization of the kernel, the hibernation image is read into the memory 103 from the non-volatile storage device 105, so that the system is restored to the state immediately before the interruption. In the following description, an activation sequence using the hibernation image is referred to as "hibernation activation".

In the present exemplary embodiment, a method for increasing the speed of the hibernation activation will be described by taking Linux (registered trademark) version 2.6.18 as a conventional method.

In Linux (registered trademark), management of the memory is executed in units of page. A region described below represents a range of the memory configured of one or more pages.

Figure 2:
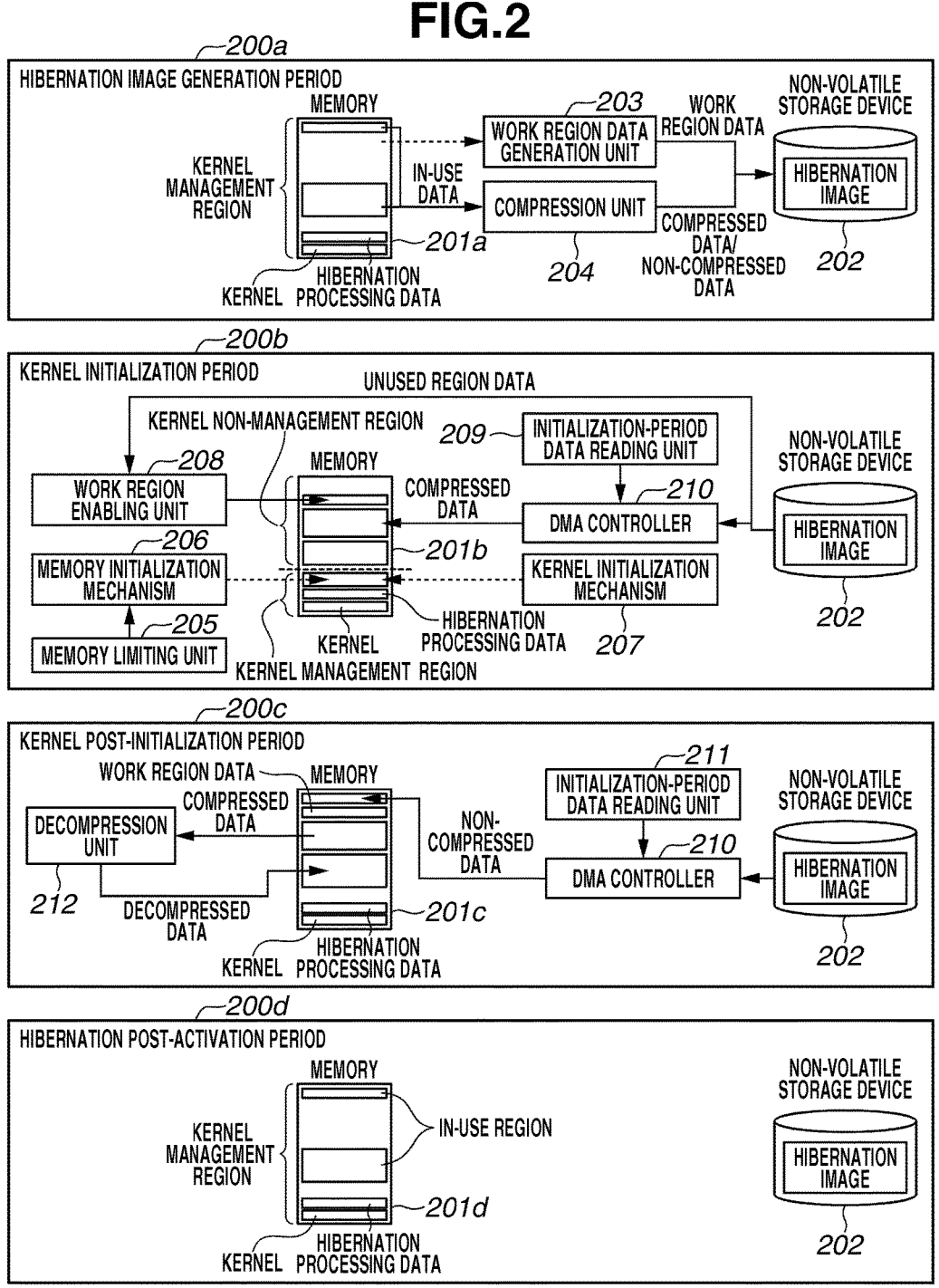
FIG. 2 is a schematic diagram illustrating a functional configuration of a hibernation mechanism.

FIG. 2 is a diagram illustrating a configuration of a hibernation mechanism according to the present exemplary embodiment. States 200a through 200d respectively indicate different states of the same memory. Specifically, the state 200a is a state in the hibernation image generation period, the state 200b is a state in the kernel initialization period, the state 200c is a state in the kernel post-initialization period, and the state 200d is a state in the hibernation post-activation period.

A compression unit 204 compresses an in-use region of a memory 201a at each page, and outputs the compressed page to a non-volatile storage device 202 as a part of the hibernation image. However, a compression rate may become low depending on the page. In such a case, the compression should not be executed thereon. Therefore, the page at a low compression rate is output to the non-volatile storage device 202 as a part of the hibernation image without being compressed. At this time, a region for storing a variable number for executing the hibernation processing (hereinafter, referred to as "hibernation processing region") is not included in the hibernation image. In order not to make change on the address value even when the system is reactivated, the hibernation processing region is statically secured from a region managed by the kernel in the hibernation activation period (described below).

A configuration for the state 200a includes a work region data generation unit (region information generation unit) 203. In the present exemplary embodiment, because reading processing of all of the compressed data is executed in the kernel initialization period, a region for the reading processing is secured from unused regions in the hibernation image generation period. Therefore, the work region data generation unit 203 collects the addresses of the unused regions in the memory 201a, organizes the collected information into a page conversion table, and outputs the page conversion table to the non-volatile storage device 202 as a part of the hibernation image. The data in the page conversion table is referred to as work region data (or region information), and the region indicated by the data is referred to as a work region.

A configuration for the state 200b includes a memory limiting unit 205 and a memory initialization mechanism 206. The memory limiting unit 205 instructs the memory initialization mechanism 206 to limit a region of a memory 201b managed by the operating system, so that the memory initialization mechanism 206 initializes the memory 201b based on the instructed limiting information. Through the above-described limiting operation, the memory 201b is divided into a kernel-management region and a non-kernel-management region. The purpose of the above limitation is to enable reading of the data into the non-kernel-management region in parallel with the kernel initialization processing by intentionally creating the non-kernel-management region.

The configuration for the state 200b also includes a kernel initialization mechanism 207. The kernel initialization mechanism 207 initializes the kernel within a range of the kernel-management region initialized by the memory initialization mechanism 206 of the memory 201b.

The configuration for the state 200b further includes a work region enabling unit 208. First, the work region enabling unit 208 reads the work region data generated by the work region data generation unit 203 into the non-kernel-management region of the memory 201b. Then, the work region enabling unit 208 secures and makes the work region for storing the compressed data usable, by overwriting the in-use page conversion table with a part of the read information.

The configuration for the state 200b further includes an initialization-period data reading unit (first reading unit) 209 and a DMAC 210. In parallel with the initialization processing executed by the kernel initialization mechanism 207, the initialization-period data reading unit 209 successively reads the hibernation image stored in the non-volatile storage device 202 into the work region by using the DMAC 210. At this time, the non-compressed data is read into a region where that data has originally been placed in the hibernation image generation period.

A configuration for the state 200c includes a post-initialization data reading unit 211. In a case where the initialization-period data reading unit 209 has not finished the reading processing of data other than the non-compressed data, the post-initialization data reading unit 211 completes the reading processing of the corresponding data. The configuration for the state 200c also includes a decompression unit 212. The decompression unit 212 decompresses the compressed data read into the memory 201c, in a region in the memory 201c where that data has originally been placed in the hibernation image generation period. In parallel with the decompression processing executed by the decompression unit 212, the post-initialization data reading unit (second reading unit) 211 reads the non-compressed data into the region where that data has originally been placed in the hibernation image generation period, by using the DMAC 210. The post-initialization data reading unit 211 does not have to distinguish between the kernel-management region and the non-kernel-management region. Through the above-described operation, the memory 201c is restored to the state similar to that of the memory 201a (except for the hibernation processing region.) In the following description, the processing executed by the post-initialization data reading unit 211 is referred to as memory restoration processing.

Further, the work region data generation unit 203, the compression unit 204, the memory limiting unit 205, the memory initialization mechanism 206, the kernel initialization mechanism 207, the work region enabling unit 208, the initialization-period data reading unit 209, the post-initialization data reading unit 211, and the decompression unit 212 are operable based on the program stored in the non-volatile storage device 202.

Next, a processing flow for generating the hibernation image according to the present exemplary embodiment will be described.

Figure 3:
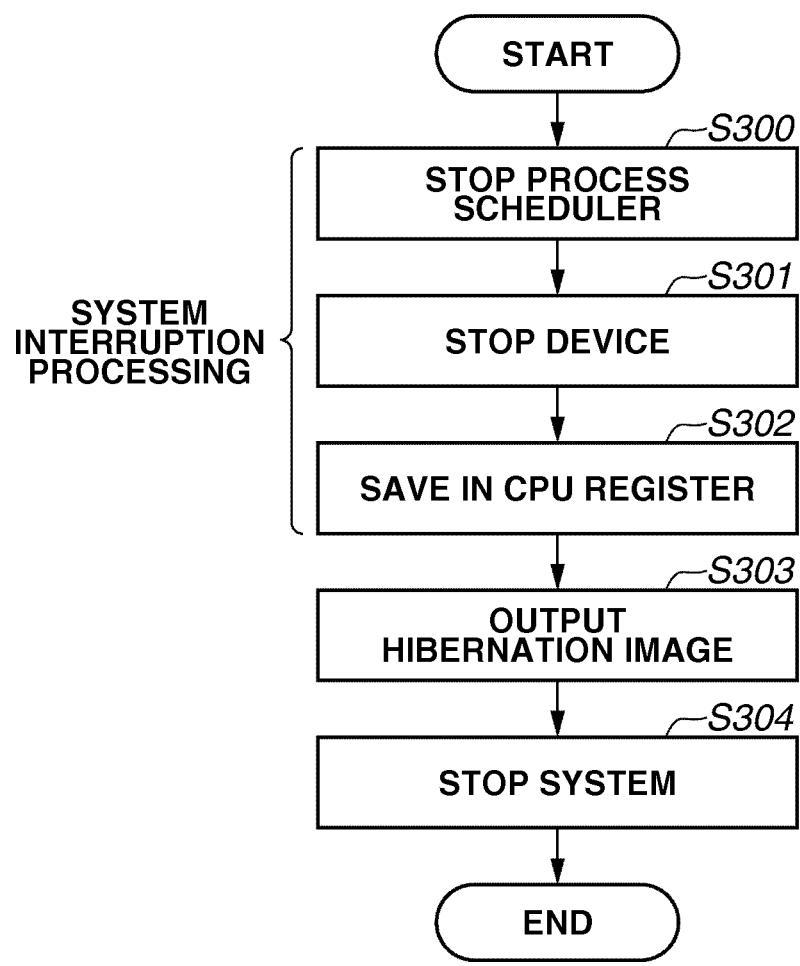
FIG. 3 is a flowchart illustrating processing for generating a hibernation image.

FIG. 3 is a flowchart illustrating a processing flow for stopping the system executed by the CPU 101 when a user (or user application) requests the CPU 101 to transfer the system to an interrupted state. At first, brief description will be given of the processing flow. In step S300, the CPU 101 stops a process scheduler. In step S301, the CPU 101 stops each device 106 and limits the interruption to the CPU 101. In step S302, the CPU 101 saves a CPU register. In step S303, the CPU 101 generates and outputs the hibernation image. Then, in step S304, the CPU 101 stops the system.

In the following description, the flowchart in FIG. 3 will be described in detail while the processing in step S300, step S301, and step S302 are referred to as system interruption processing. In step S300, when the CPU 101 entirely stops the process scheduler, subsequently, the memory content caused by the processing of the process scheduler will not be changed. In step S301, the CPU 101 stores the state of each device 106 in the memory 103, and disables the subsequent access with respect to the device 106. In step S302, the CPU 101 stores the content of the CPU register in the memory 103. Through the above system interruption processing, all the information indicating the state of the system is stored in the memory 103. Therefore, by storing the content of the memory 103 in the non-volatile storage device 105, the content thereof can be read out to the memory 103 as necessary to reset the stored states of the devices 106 and the CPU register, and the interruption and the process scheduler can be restarted, to restore the state of the system.

Figure 4:
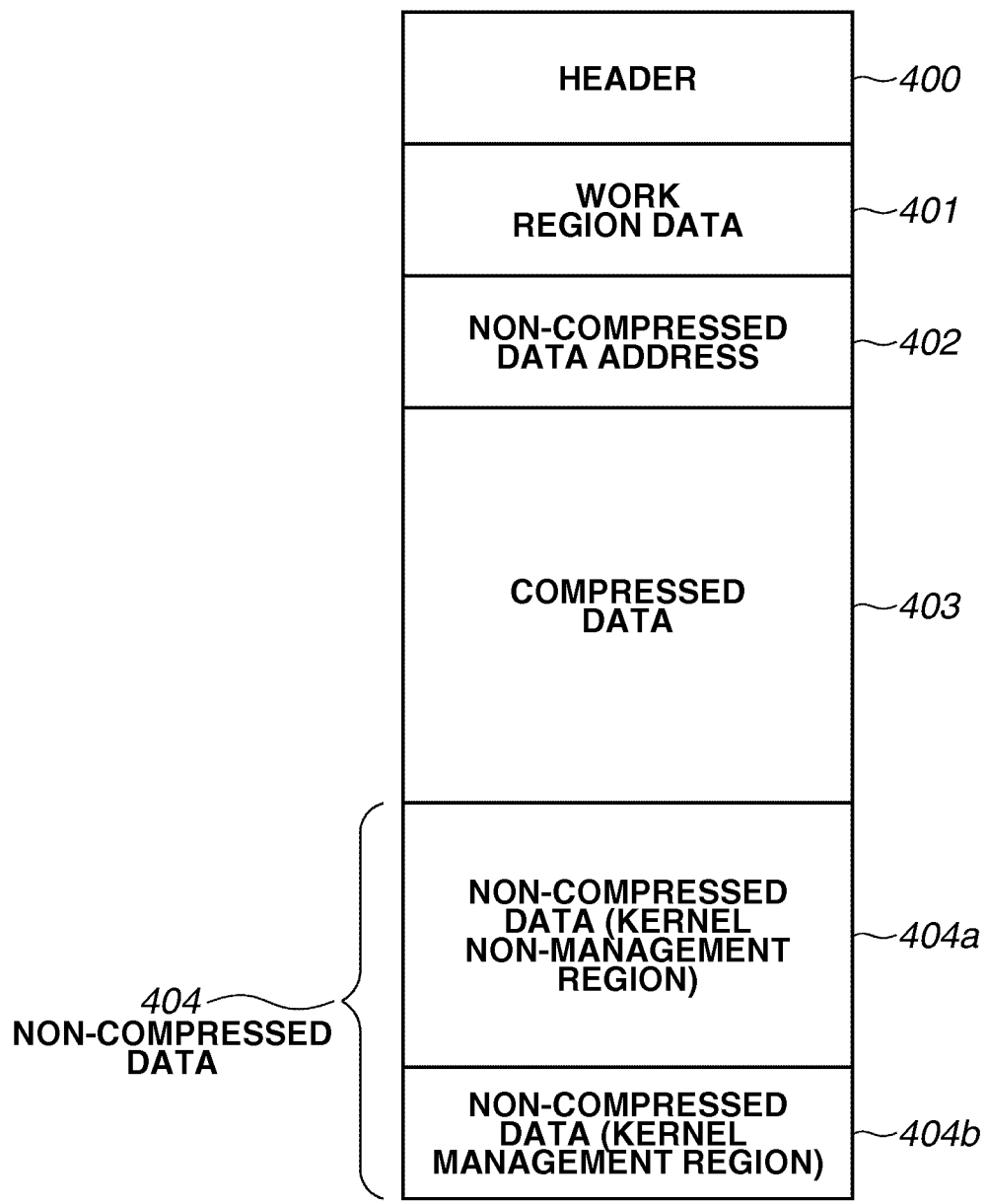
FIG. 4 is a diagram illustrating a format of the hibernation image.

In step S303, the CPU 101 generates and outputs the hibernation image to the non-volatile storage device 105 from a region of the memory 103 where the state of the system is stored through the system interruption processing. FIG. 4 is a diagram illustrating a format of the hibernation image. A header 400 is the information relating to the hibernation image, and includes an identifier that indicates whether the hibernation image is valid, a size of the non-compressed data, and a size of the compressed data. A work region data 401 stores data of the page conversion table. A compressed data 403 stores a compressed page, a size of the compressed page, and a decompression address. A non-compressed data 404 stores a non-compressed page, and a non-compressed data address 402 stores a read-in address for the non-compressed data 404.

Next, a format of the work region data 401 will be described.

The work region data 401 indicates a work region that is a read-in destination of the hibernation image in the hibernation activation period. The work region data 401 is stored in the form of a page conversion table. By storing the work region data 401 in this manner, the unused pages which are discontinuously arranged in a physical memory can be treated as a continuous region in a virtual memory. The page conversion table is configured of more than one conversion tables arranged step-by-step. In the following description, the first-level conversion table is referred to as a page global directory, whereas the second-level and subsequent-level conversion tables are referred to as page tables.

Figure 5:
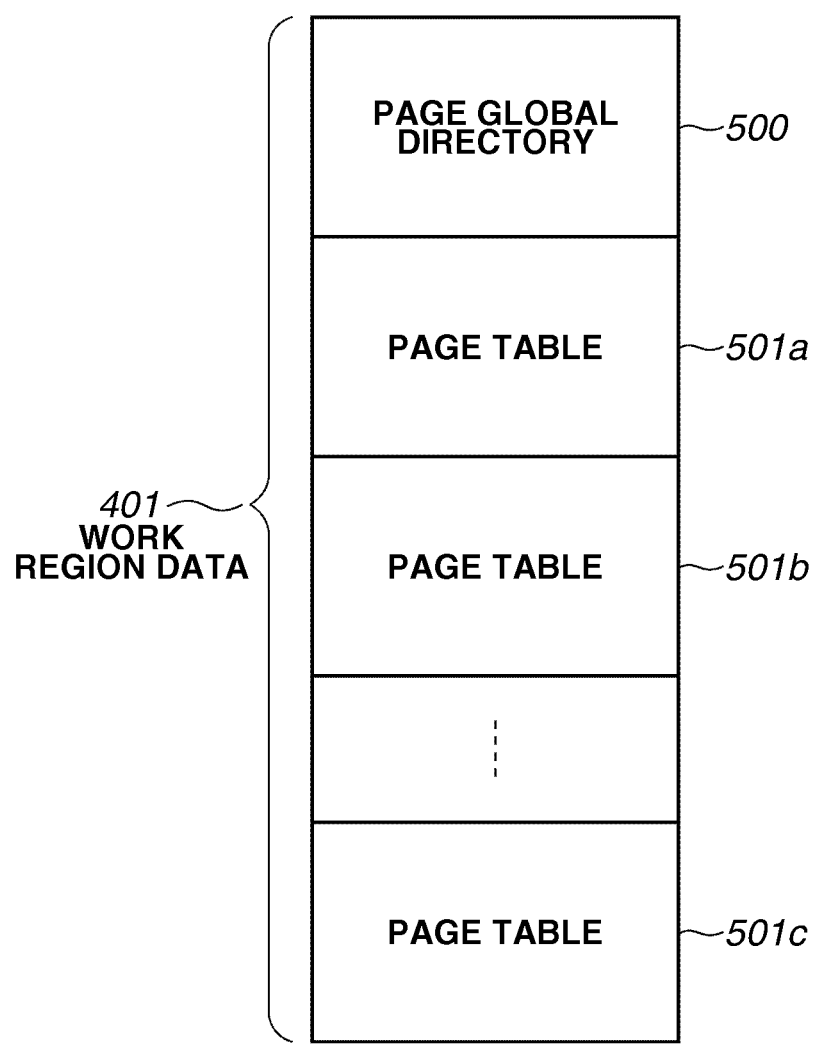
FIG. 5 is a diagram illustrating a format of work region data of the hibernation image.

FIG. 5 is a diagram illustrating a format of the work region data 401. Physical memory addresses and status flags of the page tables 501a, 501b, 501c, and so on, are described on the item corresponding to the work region of the page global directory 500. Then, according to the level of the page conversion table, the conversion tables are arranged and connected to each other in sequence from the first level of the conversion table.

Further, the page conversion table of the work region data 401 includes mapping information of the kernel-management region in the hibernation image generation period. In the hibernation activation period, this information is used to access the decompression destination of the compressed data.

Next, the formats of the non-compressed data address 402 and the non-compressed data 404 will be described.

Figure 6:
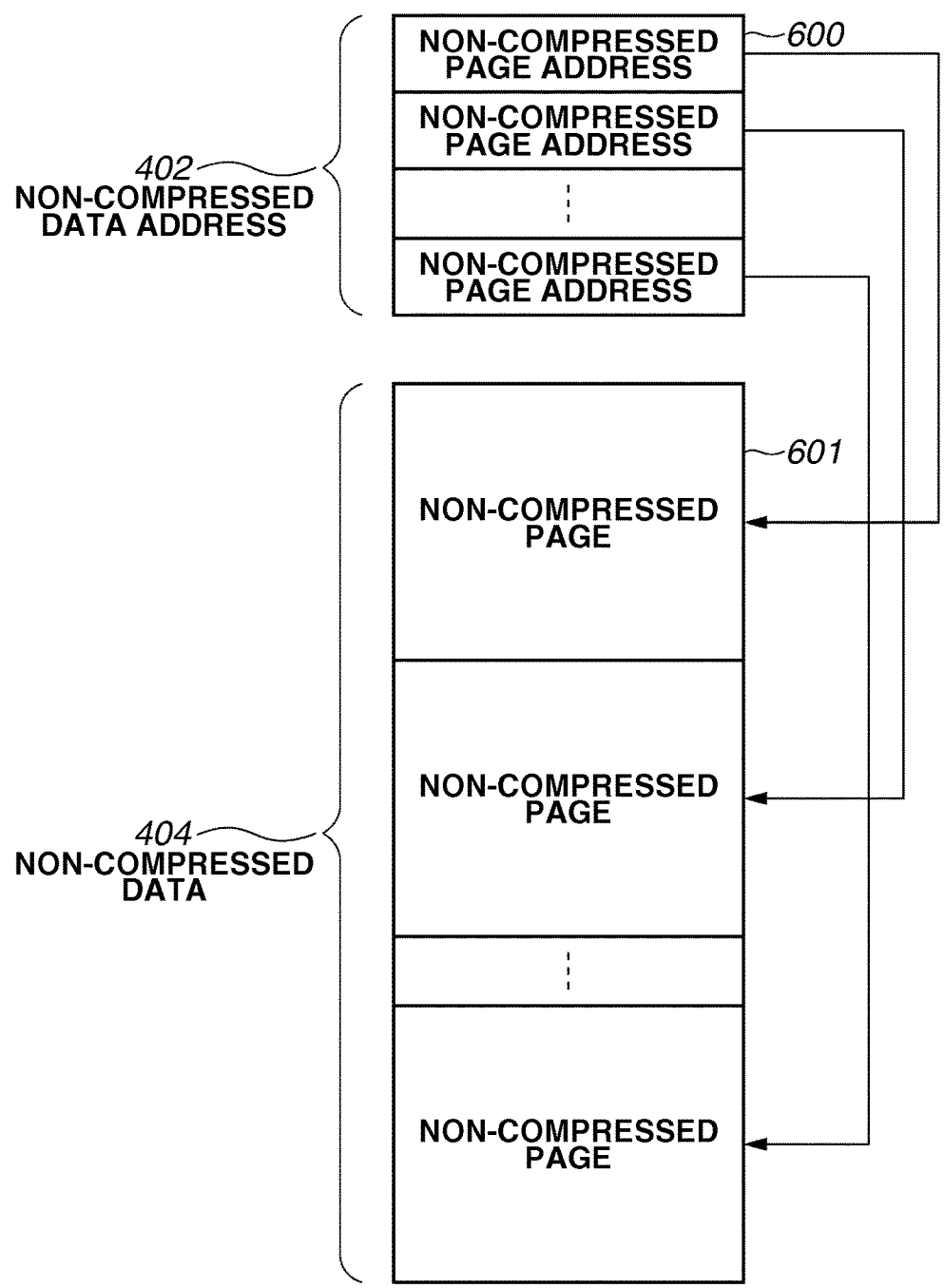
FIG. 6 is a diagram illustrating a format of non-compressed data of the hibernation image.

The non-compressed data address 402 and the non-compressed data 404 are in a corresponding relationship, and thus a destination of the data N-th stored in the non-compressed data 404 is the address N-th stored in the non-compressed data address 402. FIG. 6 is a diagram illustrating the above corresponding relationship. A non-compressed page address 600 which is N-th stored and a non-compressed page 601 which is N-th stored in the same way, are in a corresponding relationship. Number of pieces of information of the non-compressed data address 402 is equal to number of pieces of information of the non-compressed data 404.

The non-compressed data 404 includes two kinds of data, namely, a non-compressed data 404a that is restored to the non-kernel-management region, and a non-compressed data 404b that is restored to the kernel-management region. The non-compressed data 404 is divided into the above two kinds of data because the hibernation image that is readable in the kernel initialization period is limited to data from the header 400 at the top up to the non-compressed data 404a, and the non-compressed data 404b is readable only after initialization of the kernel. Therefore, the non-compressed data 404a is arranged in front of the non-compressed data 404b.

Lastly, a format of the compressed data 403 will be described.

Figure 7:
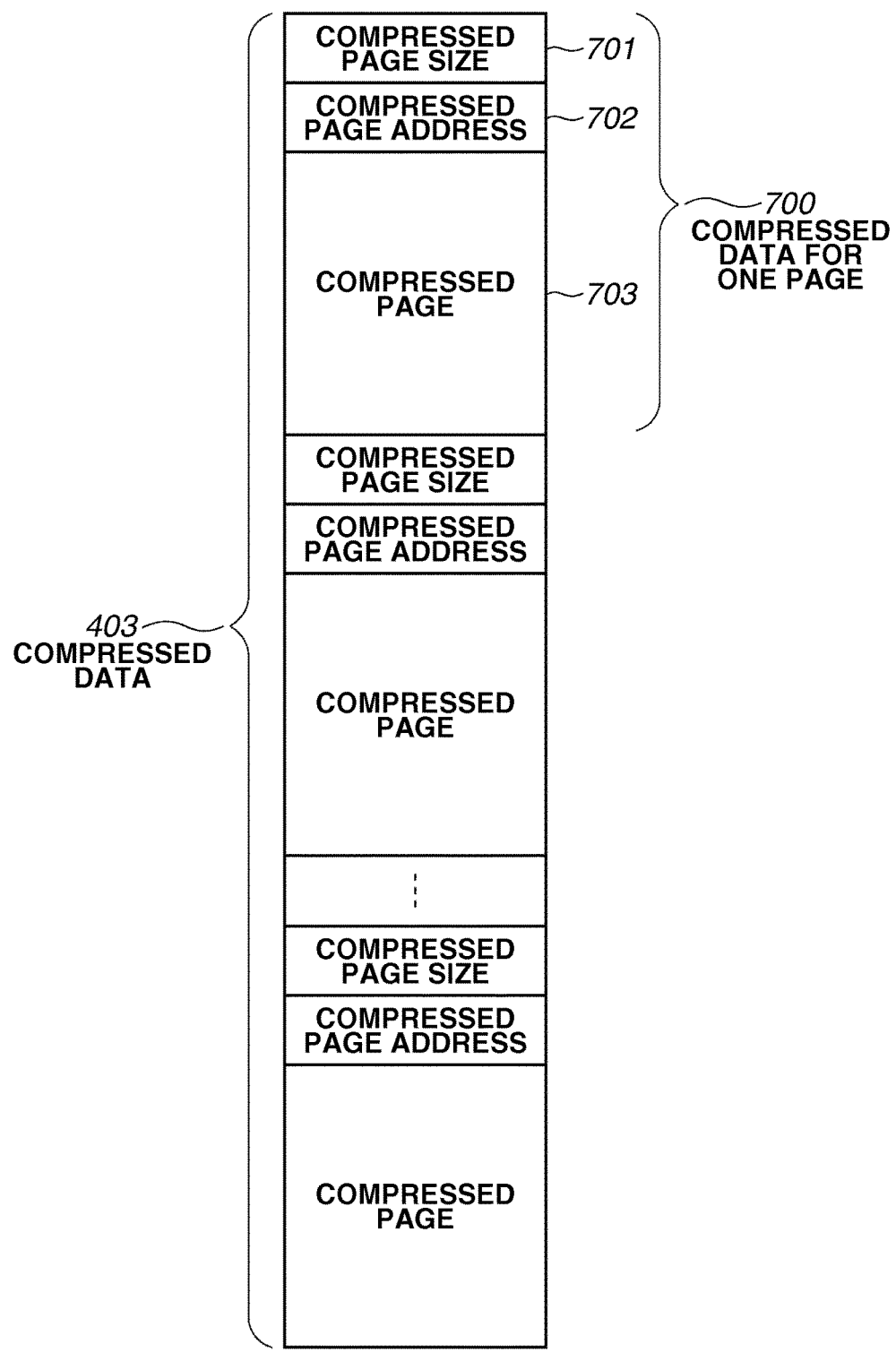
FIG. 7 is a diagram illustrating a format of compressed data of the hibernation image.

FIG. 7 illustrates a format of the compressed data 403. Compression of data will be executed in a page unit. Information 700 is the information that is generated when one page of data is compressed. The information 700 includes a compressed page size 701, a compressed page address 702, and a compressed page 703. Based on the information 700, one page of data can be restored to the memory.

For example, if the address size of the CPU is 32 bits, the compressed page size 701 is 12 bits, whereas the compressed page address 702 is 20 bits (i.e., the size capable of specifying a page of 4 GB). In this case, the compressed page 703 has to be less than 4096 bytes that can be expressed in 12 bits. If the size after the compression is equal to or greater than 4096 bytes, the page that has not been compressed is stored in the non-compressed data 404.

Hereinafter, the pages that are stored in the compressed data 403 and the non-compressed data 404 will be described.

The user (or user application) may specify an upper limit of the size of the compressed data 403 in advance. In addition to the compressed data 403, the non-compressed data address 402 and a stack at the time of decompressing a compressed data are stored in the work region. Therefore, the size of the compressed data 403 has to be smaller than a value acquired by deducting the size of the non-compressed data address 402 and the size of the stack from the size of the work region. In a case where the size of the compressed data 403 has reached the upper limit and the page cannot be stored any more, the page that has not been stored will be stored in the non-compressed data 404.

After the non-volatile storage device 105 is enabled, the hibernation image generated through the above-described operation is stored in a specified region in a physically continuous state, in a file system-independent file format.

A flow of the hibernation activation according to the present exemplary embodiment will be described below.

When the information processing apparatus 100 is turned on, the BIOS and the boot loader execute the processing as necessary to start initializing the kernel.

Figure 8:
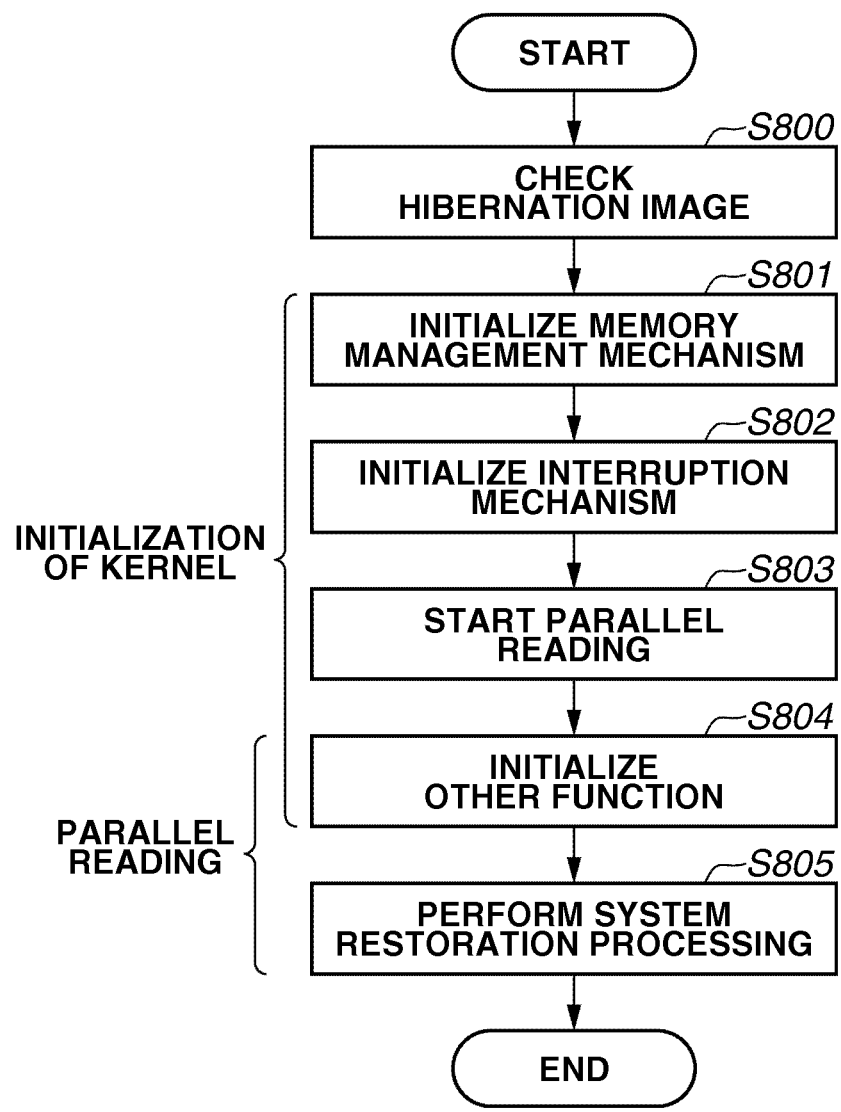
FIG. 8 is a flowchart illustrating processing for activating a system.

FIG. 8 is a flowchart illustrating the processing according to the present exemplary embodiment, from the initialization of the kernel to restoration of the hibernation image. At first, brief description will be given of the processing thereof. In step S800, the DMAC 102 reads the information in a predetermined region of the non-volatile storage device 105, and the CPU 101 checks whether a valid hibernation image is included in the read information. In step S801, the CPU 101 initializes a memory management mechanism. In step S802, the CPU 101 initializes an interruption mechanism. In step S803, the CPU 101 starts executing the parallel reading of the hibernation image. In step S804, the CPU 101 initializes the other functions, and in parallel, the DMAC 102 reads the non-compressed data address 402, the compressed data 403, and the non-compressed data 404a in sequence. In step S805, the CPU 101 and the DMAC 102 execute memory restoration processing and the preparation therefore.

Next, the flowchart in FIG. 8 will be described in detail. In step S800, the CPU 101 initializes the DMAC 102 and the I/O controller 104, and the DMAC 102 reads the header 400 of the hibernation image stored in a predetermined region of the non-volatile storage device 105 into the memory 103. If the identifier included in the header 400 is valid, the CPU 101 determines that the hibernation image is stored in the non-volatile storage device 105. The flowchart in FIG. 8 illustrates the processing that is executed when the hibernation image is present in the non-volatile storage device 105. In a case where the CPU 101 determines that the hibernation image is not present in the non-volatile storage device 105, processing for normally activating the system (not illustrated) will be executed.

In step S801, the CPU 101 limits the range of the memory 103 managed by the kernel to a specified size, and initializes the memory management mechanism. Specifically, the CPU 101 changes a memory map to limit the range of the kernel-management region. This limited size is determined based on the requisite minimum size of the memory 103 required for the kernel initialization processing, and the limited size secures at least a size larger than the size required for the initialization of the kernel. Through the above processing, two kinds of regions, namely, the kernel-management region and the non-kernel-management region are secured in the memory 103. This limitation will be cancelled when the memory restoration processing is completed.

Further, in step S801, the CPU 101 generates a page conversion table for accessing the kernel-management region. A page global directory of the page conversion table is referred to as a kernel page global directory (PGD). In addition, the CPU 101 reads a page conversion table of the work region data 401 into the memory 103. A page global directory of the page conversion table is referred to as a hibernation PGD. Then, the CPU 101 makes the work region usable by overwriting a region of the kernel PGD that is not used for the initialization of the kernel with the information relating to the work region of the hibernation PGD.

However, the page conversion table of the work region data 401 read into the memory 103 should not be overwritten with the data for initializing the kernel, the compressed data, the non-compressed data, and the decompressed data. Because the work region data 401 always includes a single page global directory, the page global directory thereof is read into the hibernation processing region. Through the operation, the page global directory thereof can be prevented from being overwritten. However, because the work region data 401 includes unspecified number of page tables, it is difficult to reserve a region for storing the page tables in the kernel-management region. Therefore, the CPU 101 reads each page table into the kernel-management region, makes the non-kernel-management region temporarily usable by the kernel, and transfers each page table to a predetermined region in the non-kernel-management region.

In step S803, the CPU 101 uses the DMAC 102 as a unit for executing parallel reading. A physical address has to be specified for the DMAC 102 instead of a virtual address. Therefore, by using the page conversion table, the CPU 101 converts the virtual address as a read-in destination of the work region into a physical address, and specifies that physical address to be the DMAC 102.

Figure 9:
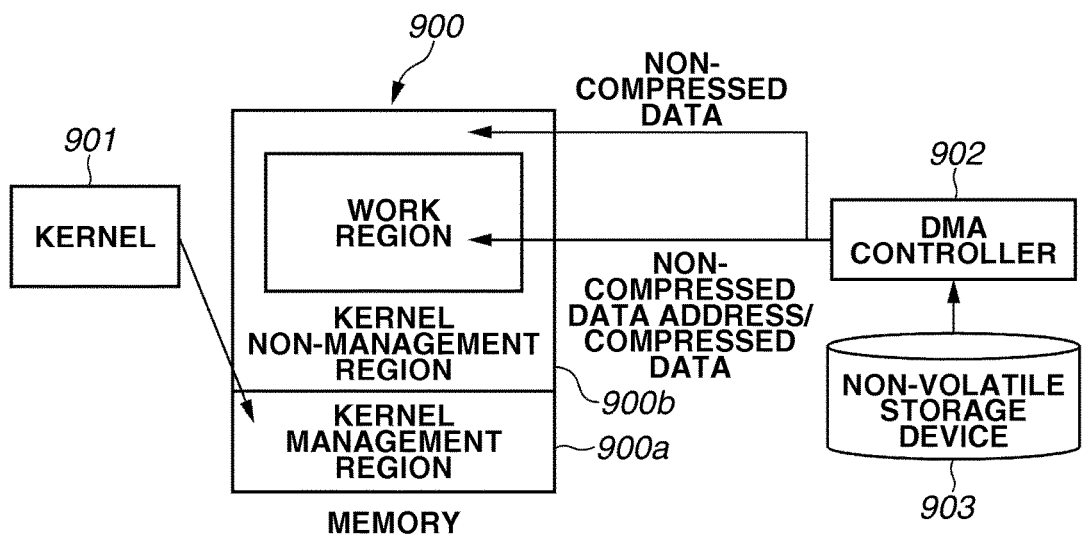
FIG. 9 is a diagram illustrating a difference in access region between a kernel and a DMA controller.

FIG. 9 is a diagram illustrating parallel reading processing executed in the kernel initialization period. A memory 900 includes a kernel-management region 900a and the non-kernel-management region 900b. A kernel 901 is executed by the CPU 101, and accesses only the kernel-management region 900a. The configuration in FIG. 9 includes a DMAC 902 and a non-volatile storage device 903. In the initialization period of the kernel executed in step S804, the DMAC 902 reads the non-compressed data address 402 and the compressed data 403 from the head of the work region in the non-kernel-management region 900b in sequence. After reading all of the above data, the DMAC 902 reads the non-compressed data 404a according to the non-compressed data address 402. As described above, the page of the non-compressed data 404a is restored to either a region other than the work region or the non-kernel-management region 900b, and thus the work region and the kernel-management region 900a will not be overwritten therewith.

When the CPU 101 specifies the parameters (i.e., transfer source address, transfer destination address, and data size) used for transferring the data, the DMAC 902 transfers the data from the non-volatile storage device 903 to the memory 900 asynchronously with the CPU 101. Because the data size that can be transferred by the DMAC 902 at one time is fixed, the CPU 101 has to specify new parameters each time the specific data size is transmitted. Therefore, in the present exemplary embodiment, interruption is executed by the DMAC 902 upon completion of the data transfer, so that the CPU 101 can specify the data to be read next to make the DMAC 902 newly execute the reading processing. Alternatively, the CPU 101 may cause the interruption to occur at regular time intervals by using a timer to check the reading state of the DMAC 902. Then, if the reading processing has been completed, the CPU 101 may specify the data to be read next to make the DMAC 902 newly execute the reading processing.

The parallel reading processing in the initialization period of the kernel is continuously executed by the DMAC 902 either until the reading processing of the non-compressed data address 402, the compressed data 403, and the non-compressed data 404*a* is completed, or just before the compressed data is decompressed after the initialization of the kernel is completed.

Figure 10:
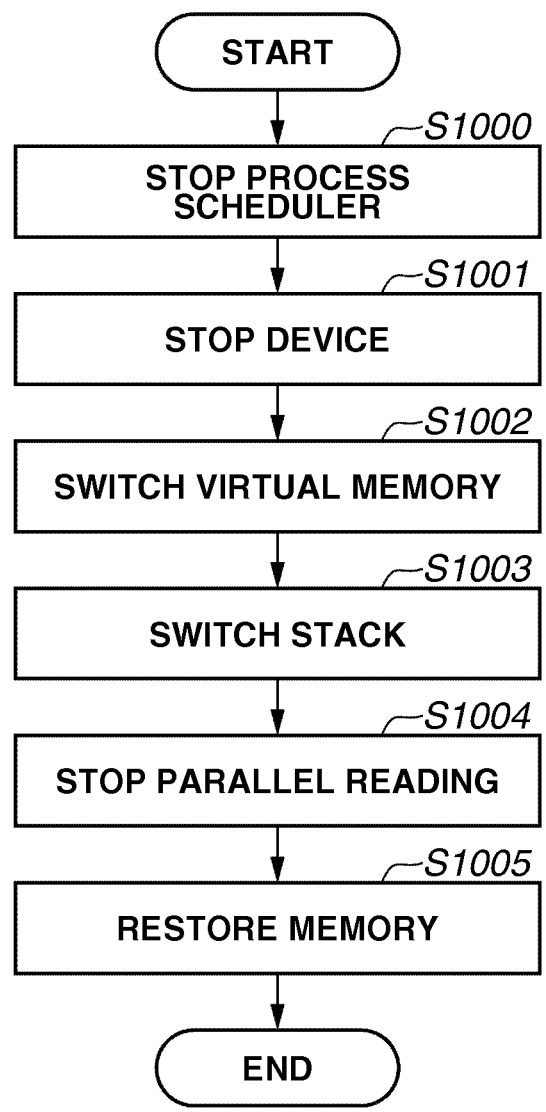
FIG. 10 is a flowchart illustrating processing for restoring the hibernation image.

FIG. 10 is a flowchart of hibernation image restoration processing according to the present exemplary embodiment, which illustrates a detail of the processing executed in step S805. In step S1000, the CPU 101 stops the process scheduler. In step S1001, the CPU 101 stops each device 106 and limits the interruption. Further, in step S1002, the CPU 101 switches the virtual memory from the kernel PGD to the hibernation PGD. In step S1003, the CPU 101 switches the stack. In step S1004, the CPU 101 stops the parallel reading executed by the DMAC 102. Then, in step S1005, the CPU 101 and the DMAC 102 execute restoration processing of the memory 103.

In addition, in step S1002, the CPU 101 switches the page conversion table. In an x86 environment, the switching processing thereof is completed by rewriting a value of the CPU register CR3 from the address of the kernel PGD to the address of the hibernation PGD. The processing is executed due to the following two reasons. The first reason is that the kernel PGD is a mapping on which limitation of the memory 103 is reflected, and thus the kernel PGD is insufficient for accessing the decompression destination. Because the hibernation PGD is a mapping before limiting the memory 103, all of the decompression destinations are accessible by switching to the page conversion table thereof. The second reason is that the kernel PGD is rewritten when the memory restoration processing is executed. As described above, because the hibernation PGD is secured in the hibernation processing region, the hibernation PGD will not be rewritten when the memory restoration processing is executed.

Figure 11:
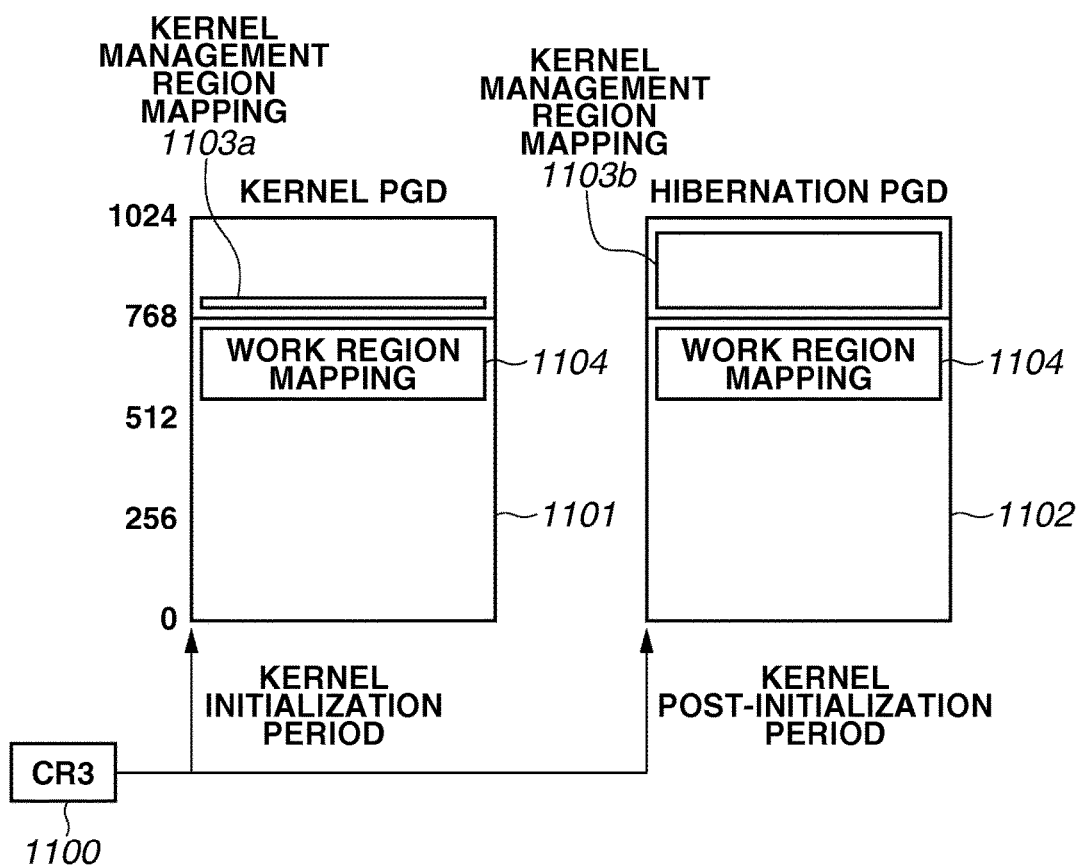
FIG. 11 is a diagram illustrating a virtual memory in a hibernation activation period.

FIG. 11 is a diagram illustrating an example of the virtual memory in the hibernation activation period when the present exemplary embodiment is applied to the x86 environment. A configuration in FIG. 11 includes a CPU register CR3 1100, a kernel PGD 1101, and a hibernation PGD 1102. Information 1103*a* is mapping information of the kernel-management region with the limited memory, whereas information 1103*b* is mapping information of the kernel-management region with no limited memory. Information 1104 is mapping information of the work region. The CPU register CR3 1100 indicates the kernel PGD 1101 before the processing in step S1001. After the processing in step S1002, the CPU register CR3 1100 indicates the hibernation PGD 1102.

In addition, in step S1003 in FIG. 10, the CPU 101 switches a place to be used in the stack. This is because the existing content of the stack is rewritten when the memory restoration processing is executed. Further, a switching destination stack also needs to be prevented from being overwritten, and thus the CPU 101 specifies an end portion in the work region as the switching destination. The restoration of the stack is executed in step S1006.

Further, in step S1004 in FIG. 10, the CPU 101 waits until the DMAC 102 stops operating. However, if the parallel reading processing by the DMAC 102 has already been completed, the CPU 101 does not have to wait.

In addition, in step S1005 in FIG. 10, in a case where all of the non-compressed data address 402 and the compressed data 403 have not been read, the CPU 101 causes the DMAC 102 to complete the reading processing. Then, the CPU 101 decompresses the compressed data 403 at each page, and reads the non-compressed data 404 in parallel with the decompression processing. At this time, the interruption has already been stopped. Therefore, during the loop processing for decompressing each page, the CPU 101 sequentially checks whether the processing executed by the DMAC 102 has been completed. The read-in destination of the data is the same as that in the parallel reading processing in the kernel initialization period. Decompression of the compressed data 703 is executed according to the compressed page size 701 and the compressed page address 702. Because the compressed page address 702 indicates the region other than the work region, the work region will not be overwritten with the compressed data 403 that has not been decompressed. The above-described processing is repeated until the decompression of all the compressed data 403 and the reading of all the non-compressed data 404 are completed.

Through the above processing, the memory 103 other than the hibernation processing region is restored to the same state as the state immediately after the processing in step S301. After restoring the memory 103, similar to the general hibernation activation, the CPU 101 executes the processing for restoring the CPU register value, restoring each device information, restarting the interruption, and restarting the process scheduler, so as to end the hibernation activation.

As described above, according to the present exemplary embodiment, when the system is reactivated by using the hibernation image, the compressed data is read in parallel with the initialization of the kernel while the non-compressed data is read in parallel with the decompression processing, and thus the system can be restored at higher speed than in a conventional method.

In addition, the initialization-period data reading unit (first reading unit) 209 and the post-initialization data reading unit (second reading unit) 211 may be configured integrally. In such a case, it is desirable that the initialization-period data reading unit (first reading unit) 209 and the post-initialization data reading unit (second reading unit) 211 are integrally configured as the DMAC 210.

Figure 15:
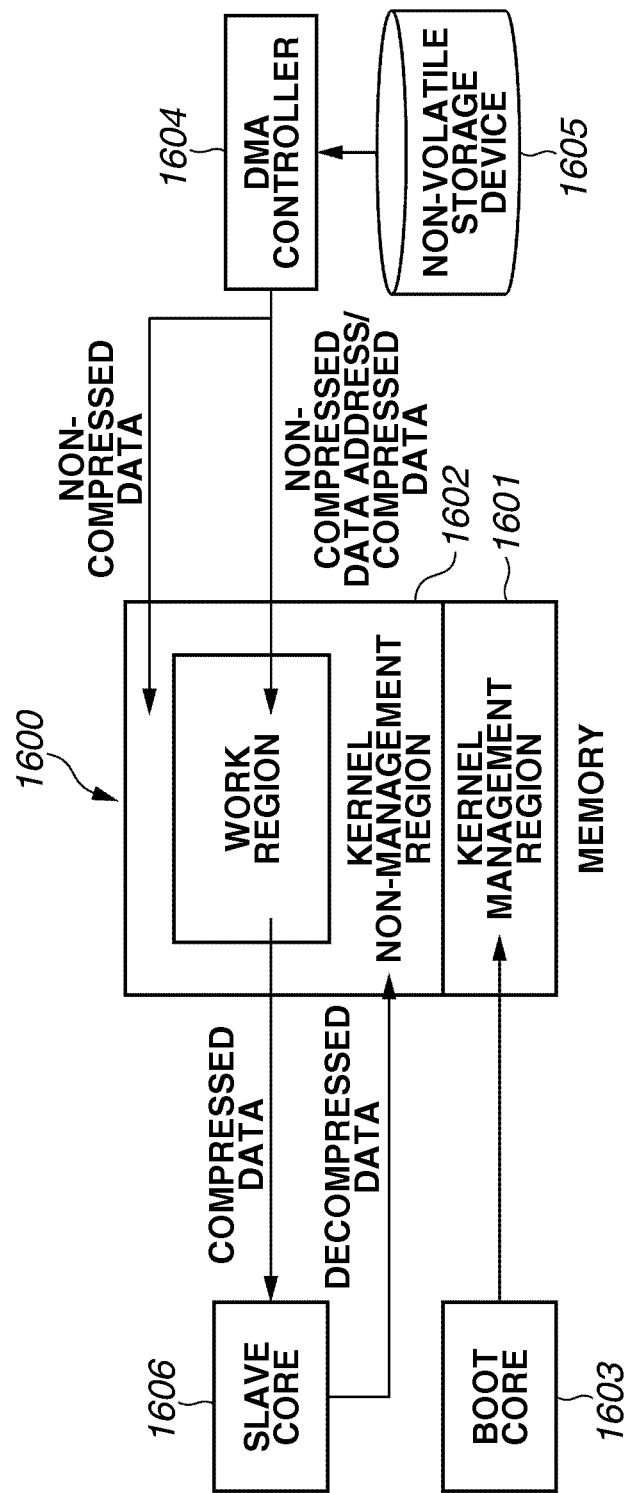
FIG. 15 is a diagram illustrating a flow of the hibernation image in a kernel initialization period.

Next, a variation example will be described. FIG. 15 is a diagram illustrating a configuration for a processing flow of the hibernation image in the kernel initialization period. A memory 1600 includes a kernel-management region 1601 and a non-kernel-management region 1602. A boot core 1603 accesses only the kernel-management region 1601. Therefore, the non-kernel-management region 1602 is not accessed by the boot core 1603, so that the non-kernel-management region 1602 can be used as an independent region. The configuration in FIG. 15 includes a DMAC 1604 and a non-volatile storage device 1605. In parallel with the initialization of the kernel executed by the boot core 1603, the DMAC 1604 sequentially reads the non-compressed data address 1402 and a compressed data 1403 from a head of the work region in the non-kernel-management region 1602 (image format will be described below with reference to FIG. 13). After reading all of the above data, the DMAC 1604 reads a non-compressed data 1407 according to the non-compressed data address 1402. A page of the non-compressed data 1407 is restored to either a region other than the work region or the non-kernel-management region 1602. Therefore, the work region and the kernel-management region 1601 will not be overwritten therewith. In parallel with the initialization of the kernel executed by the boot core 1603, a slave core 1606 decompresses the compressed data 1404 read by the DMAC 1604. As is the case with the parallel reading processing, in the decompression processing, the work region and the kernel-management region 1601 will not be overwritten. However, because a decompression destination of a compressed data 1405 is the kernel-management region 1601, the kernel-management region 1601 will be overwritten if the decompression thereof is executed in the kernel initialization period. Therefore, at this point, decompression of the compressed data 1405 cannot be executed. In a case where a plurality of slave cores 1606 can be employed, a plurality of series of decompression processing may be executed in parallel.

Generally, when the CPU 101 specifies parameters (i.e., transfer source address, transfer destination address, and data size) used for transferring the data, the DMAC 1604 transfers the data from the non-volatile storage device 1605 to the memory 1600 asynchronously with the CPU 101. Because the data size that can be transferred by the DMAC 1604 at one time is fixed, the CPU 101 has to specify new parameters each time the data of the specific data size is transferred. Therefore, in the present exemplary embodiment, interruption is executed by the DMAC 1604 upon completion of the data transfer, so that the CPU 101 can specify the data to be read next to make the DMAC 1604 newly execute the reading processing. Further, the CPU 101 may cause the interruption to occur at regular time intervals by using a timer to check the reading state of the DMAC 1604. Then, if the reading processing has been completed, the CPU 101 may specify the data to be read next to make the DMAC 1604 newly execute the reading processing. Alternatively, the CPU 101 may sequentially check the reading state of the DMAC 1604 by using the slave core 1606.

Decompression of a compressed page 1416 is executed according to a compressed page size 1414 and a compressed page address 1415. Because the compressed page address 1415 indicates the region other than the work region, the work region will not be overwritten with the compressed data 1403 that has not been decompressed.

The parallel reading in the initialization period of the kernel is executed continuously by the DMAC 1604 either until the reading processing of the non-compressed data address 1402, the compressed data 1403, and the non-compressed data 1407 are completed, or until the preparation for the memory restoration of the kernel-management region 1601 is completed. The parallel decompression processing by the slave core 1606 is also executed continuously either until the compressed data 1404 is decompressed, or until preparation for the memory restoration of the kernel-management region 1601 is completed.

FIG. 12 is a diagram illustrating the configurations of the hibernation mechanism according to the configuration in FIG. 15. FIGS. 12A through 12E illustrate each state of the hibernation in a same system.

Figure 12A:
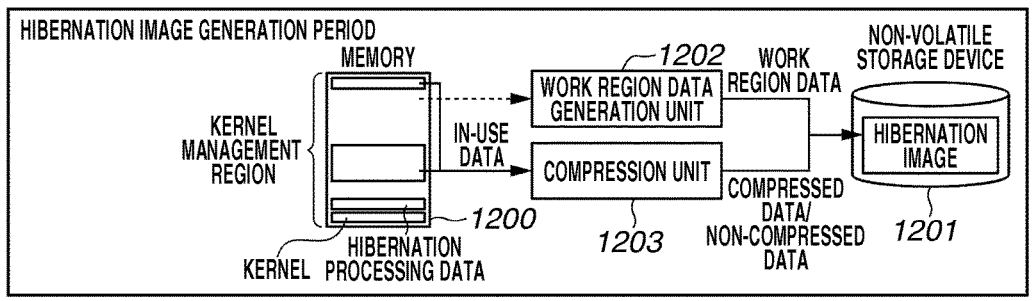
FIGS. 12A through 12E are schematic diagrams illustrating functional configurations of the hibernation mechanism.

FIG. 12A illustrates a state in the hibernation image generation period. A compression unit 1203 compresses an in-use region of a memory 1200 at each page and outputs it to a non-volatile storage device 1201 as a part of the hibernation image. However, a compression rate may become low depending on the page. In such a case, the compression should not be executed. Therefore, the page of a low compression rate is output to the non-volatile storage device 1201 as a part of the hibernation image without being compressed. However, a region for storing a variable number for executing the hibernation processing (hereinafter, referred to as "hibernation processing region") is not included in the hibernation image. In order not to change the address value even if the system is reactivated, the hibernation processing region is statically secured from a region managed by the kernel in the hibernation activation period (described below).

The configuration in FIG. 12A includes a work region data generation unit (region information generation unit) 1202. In the present exemplary embodiment, because reading processing of all of the compressed data is executed in the kernel initialization period, a region for the reading processing is secured from unused regions in the hibernation image generation period. Therefore, the work region data generation unit 1202 collects the addresses of the unused regions in the memory 1200, organizes the collected information into a page conversion table, and outputs the page conversion table to the non-volatile storage device 1201 as a part of the hibernation image. The data in the page conversion table is referred to as work region data (or region information), and the region indicated by the data is referred to as a work region.

Figure 12B:
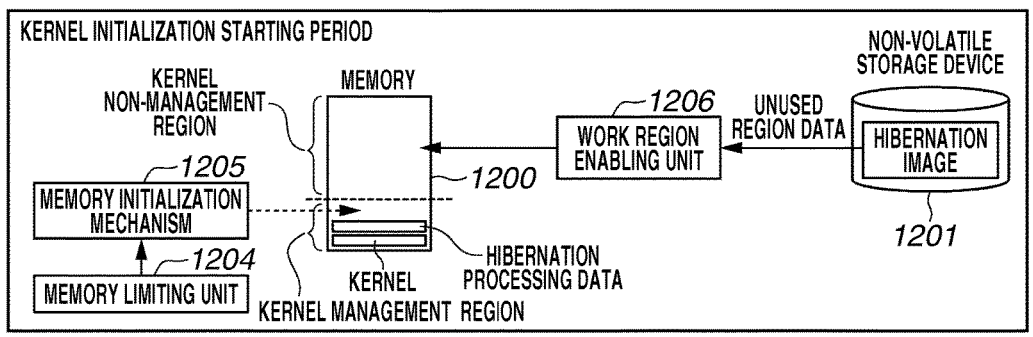

FIG. 12B illustrates a state in the kernel initialization starting period. The configuration in FIG. 12B includes a memory limiting unit 1204 and a memory initialization mechanism 1205. The memory limiting unit 1204 instructs the memory initialization mechanism 1205 to limit a region of a memory 1200 managed by the operating system, so that the memory initialization mechanism 1205 initializes the memory 1200 based on the instructed limiting information. Through the above limiting operation, the memory 1200 is divided into a kernel-management region and a non-kernel-management region. The purpose of the above limitation is to enable reading of the data and decompressing of the data into the non-kernel-management region in parallel with the kernel initialization processing executed by the boot core 1603, by intentionally creating the non-kernel-management region.

The configuration in FIG. 12B also includes a work region enabling unit 1206. The work region enabling unit 1206 reads the work region data generated by the work region data generation unit 1202 into the non-kernel-management region of the memory 1200. Then, the work region enabling unit 1206 makes the work region for storing the compressed data usable by overwriting the in-use page conversion table with a part of the read information.

Figure 12C:
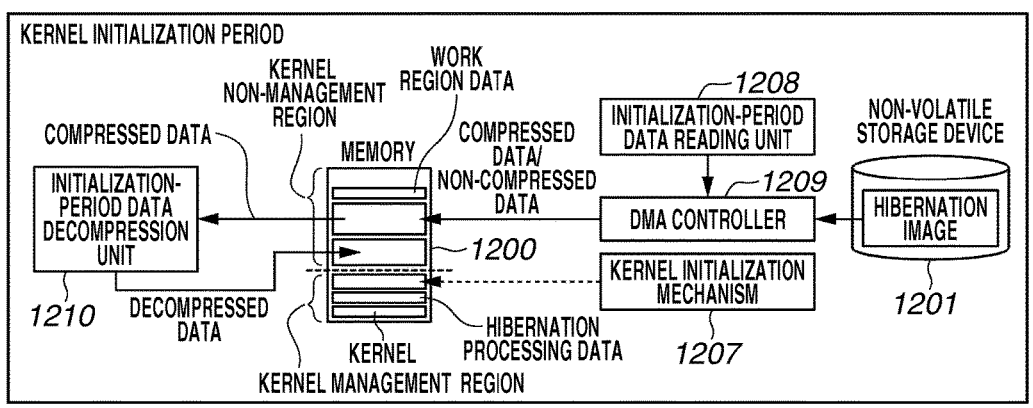

FIG. 12C illustrates a state in the kernel initialization period. A configuration in FIG. 12C includes a kernel initialization mechanism 1207. The kernel initialization mechanism 1207 initializes the kernel through the boot core 1603 within a range of the kernel-management region that is initialized by the memory initialization mechanism 1205 of the memory 1200. The configuration in FIG. 12C also includes an initialization-period data reading unit 1208 and a DMAC 1209. In parallel with the initialization processing by the kernel initialization mechanism 1207, the initialization-period data reading unit 1208 successively reads the hibernation image stored in the non-volatile storage device 1201 into the work region by using the DMAC 1209. At this time, the non-compressed data is read into a region where the data has originally been placed in the hibernation image generation period. A configuration in FIG. 12C also includes an initialization-period data decompression unit (primary decompression unit) 1210. In parallel with the initialization of the kernel, the compressed data that has been read into the memory 1200 by the initialization-period data reading unit 1208 is further decompressed in the region of the memory 1200 where that data has originally been placed in the hibernation image generation period by the slave core 1606.

Figure 12D:
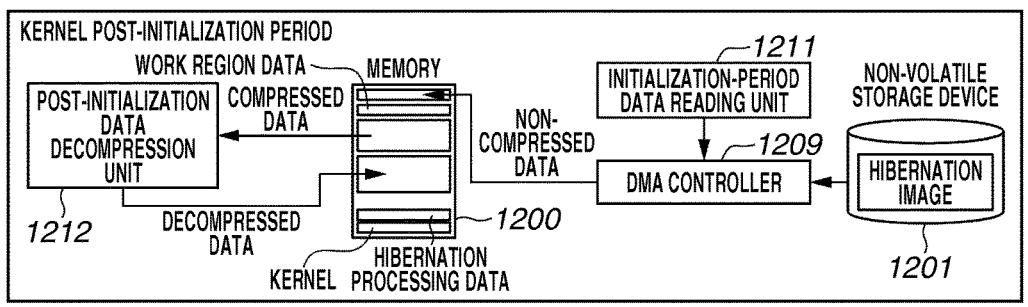

FIG. 12D illustrates a state in the kernel post-initialization period. A configuration in FIG. 12D includes a post-initialization data reading unit 1211. In a case where the initialization-period data reading unit 1208 has not finished the reading processing of data other than the non-compressed data, the post-initialization data reading unit 1211 completes the reading processing of the corresponding data. The configuration in FIG. 12D also includes a post-initialization data decompression unit (secondary decompression unit) 1212. The post-initialization data decompression unit 1212 decompresses the compressed data yet to be decompressed, which has been read into the memory 1200, in a region of the memory 1200 where that data has originally been placed in the hibernation image generation period. In parallel with the decompression processing executed by the post-initialization data decompression unit 1212, the post-initialization data reading unit 1211 reads the non-compressed data into the region of the memory 1200 where that data has originally been placed in the hibernation image generation period by using the DMAC 1209. The post-initialization data reading unit 1211 does not have to distinguish between the kernel-management region and the non-kernel-management region.

Figure 12E:
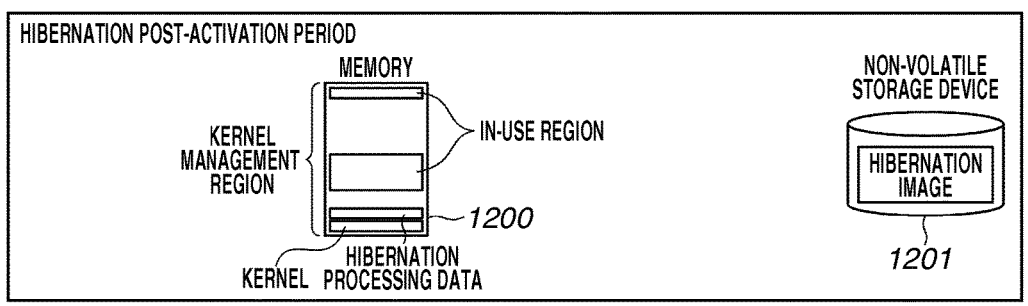

FIG. 12E illustrates a state in the hibernation post-activation period. Through the processing illustrated in FIGS. 12B through 12D, the memory 1200 is restored to the same state as that in FIG. 12A except for the hibernation processing region. In the following description, the processing executed by the post-initialization data reading unit 1211 is referred to as memory restoration processing.

Figure 13:
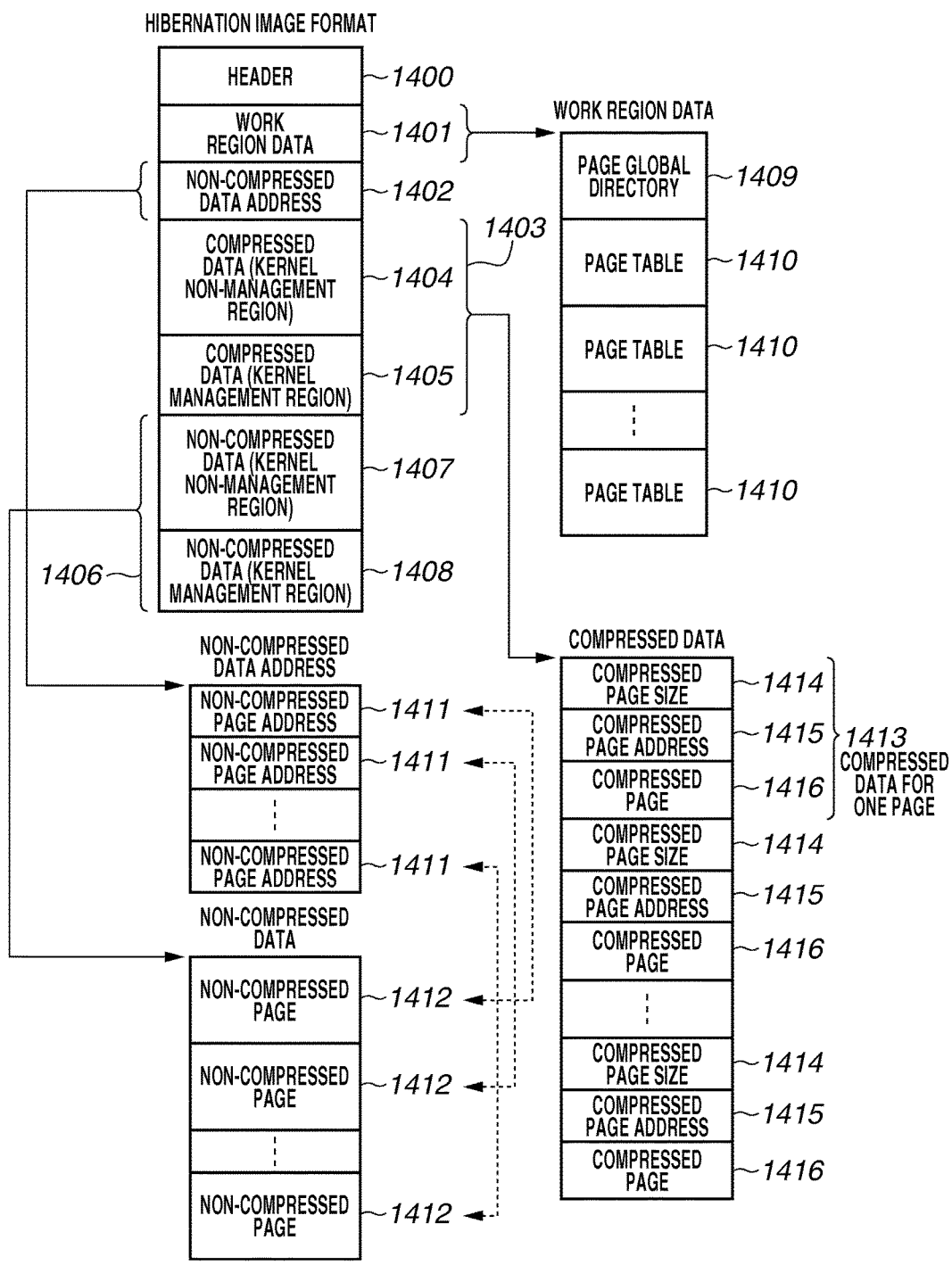
FIG. 13 is a diagram illustrating a format of the hibernation image.

In addition, the work region data generation unit 1202, the compression unit 1203, the memory limiting unit 1204, the memory initialization mechanism 1205, the kernel initialization mechanism 1207, the work region enabling unit 1206, the initialization-period data reading unit 1208, the initialization-period data decompression unit 1210, the post-initialization data reading unit 1211, and the post-initialization data decompression unit 1212 are operable based on the program stored in the non-volatile storage device 1201. FIG. 13 is a diagram illustrating a format of the hibernation image according to the configuration in FIG. 15. A header 1400 is the information relating to the hibernation image, and includes an identifier that indicates whether the hibernation image is valid, a size of the non-compressed data, and a size of the compressed data. The work region data 1401 stores data for the page conversion table. A compressed data 1403 stores a compressed page, a size of the compressed page, and a decompression address. Non-compressed data 1404 stores a non-compressed page, and a non-compressed data address 1402 stores a read-in destination address for the non-compressed data 1404.

Next, a format of the work region data 1401 will be described.

The work region data 1401 indicates a work region that is to be a read-in destination of the hibernation image in the hibernation activation period. The work region data 1401 is stored in the form of a page conversion table. By storing the work region data 1401 in this manner, the unused pages which are discontinuously arranged in the physical memory can be treated as a continuous region in the virtual memory. The page conversion table is configured of more than one conversion tables which are arranged step-by-step. In the following description, the first-level conversion table is referred to as a page global directory, whereas the second-level and subsequent-level conversion tables are referred to as page tables.

Physical memory addresses and state flags of a plurality of page tables 1410 are described on the item corresponding to the work region of the page global directory 1409. According to the level of the page conversion table, the conversion tables are arranged and connected to each other in sequence from the first level of the conversion table.

Further, the page conversion table of the work region data 1401 includes mapping information of the kernel-management region in the hibernation image generation period. In the hibernation activation period, this information is used to access the decompression destination of the compressed data.

Next, the formats of the non-compressed data address 1402 and the non-compressed data 1406 will be described.

The non-compressed data address 1402 and the non-compressed data 1406 are in a corresponding relationship, and thus a placement destination of the data N-th stored in the non-compressed data 1406 is the address N-th stored in the non-compressed data address 1402. A non-compressed page address 1411 being N-th stored and a non-compressed page 1412 similarly being N-th stored are in a corresponding relationship. The number of pieces of information of the non-compressed data address 1402 is equal to the number of pieces of information of the non-compressed data 1406.

The non-compressed data 1406 includes two kinds of data, namely, a non-compressed data 1407 that is restored to the non-kernel-management region, and a non-compressed data 1408 that is restored to the kernel-management region. The non-compressed data 1406 is divided into the above two kinds of data because the hibernation image that is readable in the kernel initialization period is limited to the data from the header 1400 at the top up to the non-compressed data 1407, and thus the non-compressed data 1408 is readable only after initialization of the kernel. Therefore, the non-compressed data 1407 is arranged in front of the non-compressed data 1408. Then, the data from the header 1400 up to the non-compressed data 1407 is regarded as a read-in target until the initialization of the kernel is completed.

Lastly, a format of the compressed data 1403 will be described.

Information 1413 is the information that is generated when one page of data is compressed. The information 1413 includes a compressed page size 1414, a compressed page address 1415, and a compressed page 1416. The compression of data will be executed in a page unit. Based on the information 1413, one page of data can be restored to the memory 1600.

For example, if the address size of the CPU is 32 bits, the compressed page size 1414 is 12 bits, whereas the compressed page address 1415 is 20 bits (i.e., the size capable of specifying a page of 4 GB). In this case, the compressed page 1416 has to be less than 4096 bytes that can be expressed in 12 bits. If the size after the compression is equal to or greater than 4096 bytes, the page that has not been compressed is stored in the non-compressed data 1406.

Next, the pages that are stored in the compressed data 1403 and the non-compressed data 1406 will be described. The user (or user application) may specify the upper limit for the size of the compressed data 1403 in advance. In addition to the compressed data 1403, the non-compressed data address 1402 and a stack at the time of decompressing a compressed data are stored in the work region. Therefore, the size of the compressed data 1403 has to be smaller than a value acquired by deducting the size of the non-compressed data address 1402 and the size of the stack therefore from the size of the work region. In a case where the size of the compressed data 1403 has reached the upper limit and the page cannot be stored any more, the page that has not been stored will be stored in the non-compressed data 1406.

As is the case with the non-compressed data 1406, the compressed data 1403 is configured of two kinds of data, namely, the compressed data 1404 that is restored to the non-kernel-management region, and the compressed data 1405 that is restored to the kernel-management region. The reason for dividing the compressed data 1403 in this manner is the same as that of the non-compressed data 1406. Only the compressed data 1405 is regarded as a decompression target until the initialization of the kernel is completed.

After enabling the non-volatile storage device 1605, the hibernation image generated through the above-described operation is stored in a specified region in a physically continuous state, in a file system-independent file format.

Next, a flow of the hibernation activation according to the present exemplary embodiment will be described below. When the information processing apparatus 100 is turned on, the BIOS and the boot loader execute the processing as necessary to start initializing the kernel.

Figure 14:
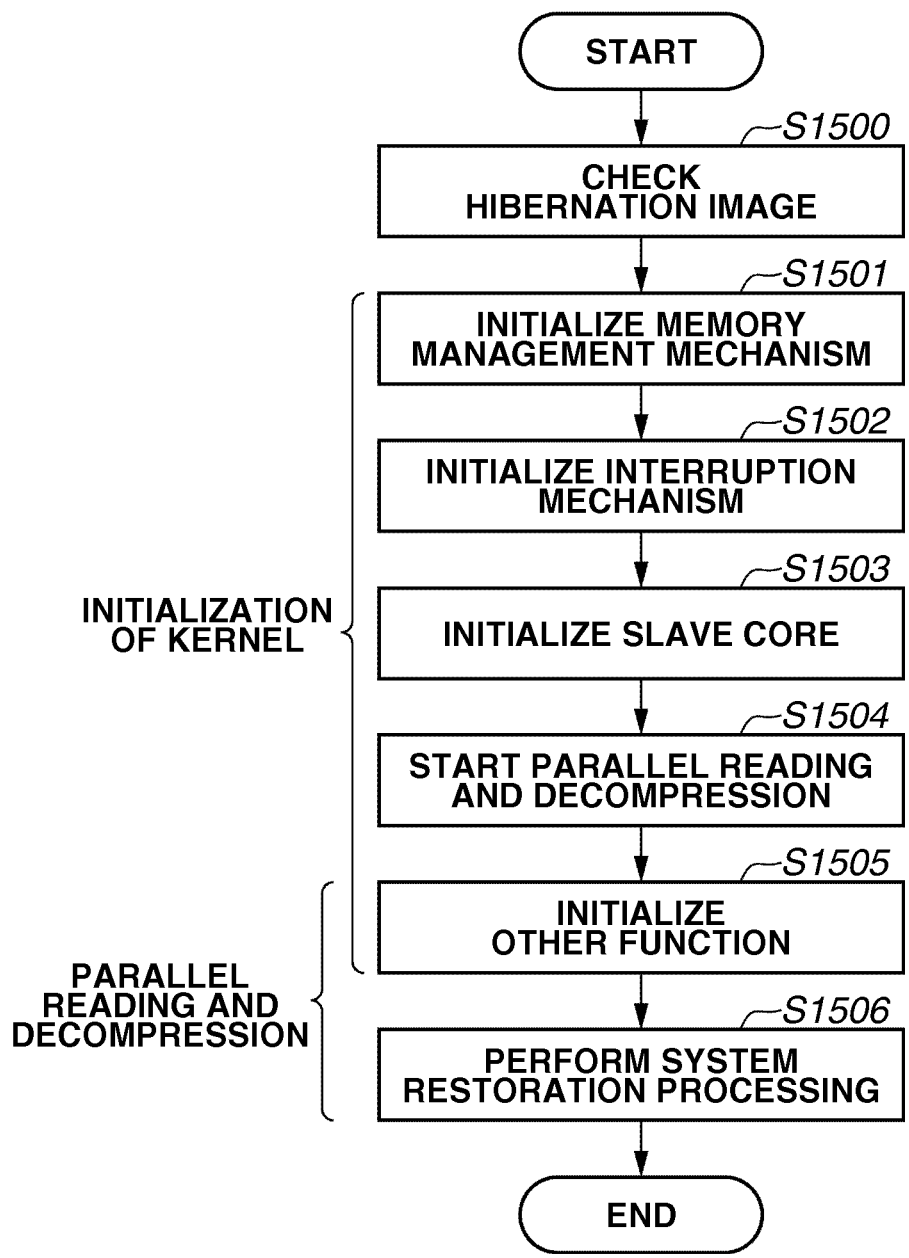
FIG. 14 is a flowchart illustrating processing for activating the system.

FIG. 14 is a flowchart according to the configuration in FIG. 15. The flowchart in FIG. 14 illustrates details of a processing flow from starting the initialization of the kernel to restoring the hibernation image, and a processing flow for executing the system restoration processing. First, the processing flow from starting the initialization of the kernel to restoring the hibernation image will be described. In step S1500, the DMAC 1604 reads the information of a predetermined region in the non-volatile storage device 1605, and the CPU 101 checks whether a valid hibernation image is included in the read information of the predetermined region in the non-volatile storage device 1605. In step S1501, the CPU 101 initializes the memory management mechanism. In step S1502, the CPU 101 initializes the interruption mechanism. In step S1503, the CPU 101 initializes the slave core 1606. In step S1504, the CPU 101 starts the parallel reading of the hibernation image and the decompression of the compressed data. In step S1505, the CPU 101 initializes the other functions, and in parallel, the DMAC 1604 reads the non-compressed data address 402, the compressed data 403, and the non-compressed data 407 in sequence. In step S1506, the CPU 101 and the DMAC 1604 execute the memory restoration processing and the preparation therefore.

In step S1500, the CPU 101 initializes the DMAC 1604 and the I/O controller 104, and the DMAC 1604 reads the header 400 of the hibernation image stored in a predetermined region of the non-volatile storage device 1605 into the memory 1600. If the identifier included in the header 400 is valid, the CPU 101 determines that the hibernation image is stored in the non-volatile storage device 1605. The flowchart in FIG. 14 illustrates the processing that is executed when the hibernation image is present in the non-volatile storage device 1605. In a case where the CPU 101 determines that the hibernation image is not present in the non-volatile storage device 1605, the CPU 101 activates the system normally.

In step S1501, the CPU 101 limits the range of the memory 1600 managed by the kernel to a specified size, and initializes the memory management mechanism. Specifically, the CPU 101 changes a memory map to limit the range of the kernel-management region. This limited size is determined based on the requisite minimum size of the memory 1600 required for the kernel initialization processing, and the limited size secures at least the size larger than the size required for the initialization of the kernel. Through the above processing, two kinds of regions, namely, the kernel-management region and the non-kernel-management region are secured in the memory 1600. This limitation will be cancelled when the memory restoration processing is completed.

Further, in step S1501, the CPU 101 generates a page conversion table for accessing the kernel-management region. A page global directory of the page conversion table is referred to as a kernel page global directory (PGD). In addition, the CPU 101 reads a page conversion table of the work region data 1401 into the memory 1600. A page global directory of the page conversion table is referred to as a hibernation PGD 1102. Then, the CPU 101 secures the usable work region by overwriting a region of the kernel PGD 1101 which is not used for the initialization of the kernel, with the information relating to the work region of the hibernation PGD 1102.

However, the page conversion table of the work region data 1401 read into the memory 1600 should not be overwritten with the data for initializing the kernel, the compressed data, the non-compressed data, and the decompressed data. Because the work region data 1401 always includes a single page global directory, the page global directory thereof is read into the hibernation processing region. Through the operation, the overwriting can be prevented. However, because the work region data 1401 includes unspecified number of page tables, it is difficult to ensure a region for storing the page tables in the kernel-management region. Therefore, the CPU 101 reads each page table into the kernel-management region, makes the non-kernel-management region temporarily usable by the kernel, and transfers each page table to a predetermined region in the non-kernel-management region.

In step S1504, the CPU 101 starts executing the parallel reading of the hibernation image and the decompression of the compressed data. As a unit for executing the parallel reading, the CPU 101 uses the interruption mechanism initialized in step S1502. A physical address has to be specified for the DMAC 1604 instead of a virtual address. Therefore, by using the page conversion table, the CPU 101 converts the virtual address that is to be a read-in destination of the work region to a physical address, and specifies that physical address to the DMAC 1604. Next, as a unit for executing the decompression, the CPU 101 uses the slave core 1606 that is initialized in step S1503. Then, the CPU 101 decompresses the compressed data 1404 of the hibernation image read by the DMAC 1604.

Other Embodiments

Additional embodiments can also be realized by a computer of a system or apparatus that reads out and executes computer executable instructions recorded on a storage medium (e.g., computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these embodiments are not seen to be limiting. The scope of the following claims is to be accorded the broadest interpretation so as to encompass all such modifications and equivalent structures and functions.

This application claims the benefit of Japanese Patent Application No. 2012-235481, filed Oct. 25, 2012, No. 2012-235482, filed Oct. 25, 2012 and No. 2012-235483, filed Oct. 25, 2012 which are hereby incorporated by reference herein in their entirety.

What is claimed is:

1. An information processing apparatus comprising:
a volatile memory;
at least one processor that operates to: (i) compress at least a part of data stored in the volatile memory into compressed data, and (ii) decompress compressed data read into the volatile memory; a non-volatile memory configured to store non-compressed data and the compressed data as hibernation images;
a first reading circuit configured to read the compressed data stored in the non-volatile memory into a region in the volatile memory that is not used for initialization of a kernel; and
a second reading circuit configured to read the non-compressed data stored in the non-volatile memory into the volatile memory in parallel with the decompression processing executed by the at least one processor,
wherein the at least one processor further operates to activate a system based on the decompressed data and the non-compressed data read by the second reading circuit, and
wherein the initialization of the kernel executed by using a part of the volatile memory which is exclusively independent of the region used by at least one of the processing executed by the first reading circuit and the processing executed by the second reading circuit, the processing executed by the first reading circuit and the processing executed by the second reading circuit are in parallel.

2. The information processing apparatus according to claim 1, wherein the at least one processor further operates to allocate a kernel-management region used for the initialization of the kernel, and a non-kernel-management region not used for the initialization of the kernel to the volatile memory.

3. The information processing apparatus according to claim 2,
wherein the at least one processor makes a size of the kernel-management region larger than a size required for the initialization of the kernel.

4. The information processing apparatus according to claim 2, wherein, by using a direct memory access controller (DMAC), the first reading circuit reads the compressed data stored in the non-volatile memory into the non-kernel-management region, and reads the non-compressed data into the non-kernel-management region in a case where reading processing for all of the compressed data stored in the non-volatile memory has been completed.

5. The information processing apparatus according to claim 1,
wherein the at least one processor executes normal activation that does not use the hibernation image in a case where the hibernation image is not saved in the non-volatile memory.

6. The information processing apparatus according to claim 1, wherein the at least one processor is further configured to save the hibernation image in the non-volatile memory.

7. The information processing apparatus according to claim 6,
wherein the at least one processor saves the hibernation image in a file system-independent file format in the non-volatile memory.

8. The information processing apparatus according to claim 1,
wherein the at least one processor compresses data stored in the volatile memory for each predetermined size and determines whether to store the data as compressed data according to a compression rate.

9. The information processing apparatus according to claim 1,
wherein, in a case where the reading processing for all of the compressed data stored in the non-volatile memory has not been completed, the at least one processor reads all of the compressed data into the volatile memory.

10. The information processing apparatus according to claim 1,
wherein the at least one processor decompresses data in the volatile memory without overwriting the compressed data that has not been decompressed with the decompressed data.

11. The information processing apparatus according to claim 1,
wherein the second reading circuit reads the non-compressed data stored in the non-volatile memory into the volatile memory by using a direct memory access controller (DMAC) or the at least one processor.

12. The information processing apparatus according to claim 1, wherein the initialization of the kernel executed by using a part of the volatile memory, the processing executed by the first reading circuit, the processing executed by the second reading circuit and the decompression processing executed by the at least one processor are in parallel.

13. The information processing apparatus according to claim 1, wherein the initialization of the kernel is executed by a boot core.

14. An information processing apparatus comprising:
a volatile memory;
a non-volatile memory configured to store a hibernation image including compressed data and non-compressed data; and
at least one processor that operates to:
read the compressed data stored in the non-volatile memory into the volatile memory; and
read the non-compressed data stored in the non-volatile memory into the volatile memory in parallel with decompression of the compressed data read by the at least one processor,
wherein initialization of a kernel executed by using a part of the volatile memory which is exclusively independent of a region used by at least one of the at least one processor when reading the compressed data and the at least one processor when reading the non-compressed data, the processing of reading the compressed data and the processing of reading the non-compressed data are in parallel.

15. An activation method for an information processing apparatus including a volatile memory and a non-volatile memory for storing a hibernation image including compressed data and decompressed data, the activation method comprising:

reading compressed data stored in the non-volatile memory into a region that is not used for initialization of a kernel at the time of initialization;

decompressing compressed data read into the non-volatile memory;

reading non-compressed data stored in the non-volatile memory into the volatile memory, at a time of post-initialization, in parallel with the decompressing; and activating a system based on the data decompressed by decompressing and the non-compressed data read by the reading at the time of post-initialization, wherein the initialization of the kernel executed by using a part of the volatile memory which is exclusively independent of the region used by at least one of the processing executed by the reading compressed data step and the processing executed by the reading non-compressed data step, the processing of reading the compressed data and the processing of reading the non-compressed data are in parallel.

16. An activation method for an information processing apparatus including at least one processor and including a volatile memory and a non-volatile memory for storing a hibernation image including compressed data and non-compressed data, the activation method comprising:

primarily decompressing, via the at least one processor, read compressed data to a region that is not used for initialization of a kernel by reading the compressed data stored in the non-volatile memory into a region that is not used for the initialization of the kernel;

secondarily decompressing, via the at least one processor, compressed data that has not been decompressed by the primarily decompressing, in the volatile memory while reading non-compressed data stored in the non-volatile memory into the volatile memory after the initialization of the kernel; and activating, via the at least one processor, a system by using data decompressed by the primarily decompressing and the secondarily decompressing, wherein the initialization of the kernel loaded on the volatile memory which is exclusively independent of the region used by at least one of the processing executed by the primarily decompressing read compressed data by reading the compressed data step and the processing executed by the secondarily decompressing compressed data while reading non-compressed data step, the processing of reading the compressed data and the processing of reading the non-compressed data are in parallel.

* * * * *